(12) United States Patent
Shaffer et al.

(10) Patent No.: US 8,997,901 B2
(45) Date of Patent: Apr. 7, 2015

(54) VEHICULAR BODY PANEL ENERGY GENERATOR SYSTEM

(75) Inventors: Aric Shaffer, Saline, MI (US); Joseph Patterson, Dearborn, MI (US); Ronald Miller, Saline, MI (US); Perry Macneille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1490 days.

(21) Appl. No.: 11/433,372

(22) Filed: May 11, 2006

(65) Prior Publication Data
US 2007/0261896 A1 Nov. 15, 2007

(51) Int. Cl.
*B60K 16/00* (2006.01)
*B60L 11/14* (2006.01)
*B60L 8/00* (2006.01)

(52) U.S. Cl.
CPC ............ *B60L 11/14* (2013.01); *B60L 8/003* (2013.01); *B60L 2270/12* (2013.01); *Y02T 10/7077* (2013.01); *Y02T 10/7083* (2013.01); *Y02T 10/90* (2013.01)

(58) Field of Classification Search
USPC .......................... 180/2.1, 2.2; 136/243–265; 257/E25.009
See application file for complete search history.

(56) References Cited

U.S. PATENT DOCUMENTS

| | | | |
|---|---|---|---|
| 3,943,726 A * | 3/1976 | Miller | 62/235.1 |
| 3,971,454 A * | 7/1976 | Waterbury | 180/65.8 |
| 4,090,577 A * | 5/1978 | Moore | 180/243 |
| 4,141,425 A * | 2/1979 | Treat | 180/2.2 |
| 4,167,935 A * | 9/1979 | Severson | 126/704 |
| 4,181,188 A * | 1/1980 | Dessert | 180/2.2 |
| 4,327,316 A | 4/1982 | Fujikubo et al. | |
| RE31,156 E * | 2/1983 | Dessert | 180/2.2 |
| 4,528,947 A | 7/1985 | Olivera | |
| 4,592,436 A * | 6/1986 | Tomei | 180/2.2 |
| 4,633,767 A * | 1/1987 | Sain | 454/92 |
| 4,663,495 A * | 5/1987 | Berman et al. | 136/248 |
| 4,686,322 A * | 8/1987 | Kujas | 136/245 |
| 4,804,140 A * | 2/1989 | Cantrell | 236/49.3 |
| 5,008,062 A * | 4/1991 | Anderson et al. | 264/272.15 |
| 5,059,254 A * | 10/1991 | Yaba et al. | 136/251 |
| 5,213,626 A * | 5/1993 | Paetz | 136/244 |
| 5,315,227 A * | 5/1994 | Pierson et al. | 320/101 |
| 5,489,002 A * | 2/1996 | Streiff | 180/65.31 |
| 5,545,261 A * | 8/1996 | Ganz et al. | 136/251 |
| 5,644,207 A * | 7/1997 | Lew et al. | 320/101 |
| 5,680,907 A * | 10/1997 | Weihe | 180/2.2 |
| 5,725,062 A * | 3/1998 | Fronek | 180/2.2 |
| 5,767,663 A * | 6/1998 | Lu | 322/12 |
| 5,908,077 A * | 6/1999 | Moore | 180/65.25 |

(Continued)

FOREIGN PATENT DOCUMENTS

JP 2005102472 4/2005

OTHER PUBLICATIONS

DE filing Hearing Report.

*Primary Examiner* — Hau Phan
*Assistant Examiner* — Jacob Meyer
(74) *Attorney, Agent, or Firm* — David Kelley, Esq.; Tung & Associates

(57) ABSTRACT

A vehicular body panel energy generator system is disclosed. An illustrative embodiment of the system includes a vehicle body and a plurality of body panels forming the vehicle body. At least one of the body panels comprises a vehicular solar panel. A method of generating and utilizing electrical power in a vehicle is also disclosed.

17 Claims, 3 Drawing Sheets

(56) References Cited

U.S. PATENT DOCUMENTS

| | | | |
|---|---|---|---|
| 5,986,429 A * | 11/1999 | Mula, Jr. | 320/101 |
| 6,024,264 A * | 2/2000 | Java | 224/576 |
| 6,155,635 A * | 12/2000 | Wecker | 296/211 |
| 6,313,438 B1 * | 11/2001 | Emerick, Jr. | 219/212 |
| 6,331,673 B1 * | 12/2001 | Kataoya et al. | 136/259 |
| 6,406,090 B1 * | 6/2002 | Tolinski et al. | 296/223 |
| 6,423,894 B1 * | 7/2002 | Patz et al. | 136/244 |
| 6,439,658 B1 * | 8/2002 | Ganz et al. | 297/180.14 |
| 6,448,740 B1 * | 9/2002 | Kirkpatrick | 320/101 |
| 6,536,828 B2 * | 3/2003 | Love et al. | 296/96.19 |
| 6,586,668 B2 * | 7/2003 | Shugar et al. | 136/244 |
| 6,682,132 B1 * | 1/2004 | Hahn | 296/215 |
| 6,702,370 B2 * | 3/2004 | Shugar et al. | 296/211 |
| 6,856,116 B1 | 2/2005 | Kirkpatrick | |
| 6,991,051 B2 * | 1/2006 | Swindell et al. | 180/65.1 |
| 7,301,215 B2 * | 11/2007 | Kariya | 257/458 |
| 7,309,831 B2 * | 12/2007 | Yamada et al. | 136/251 |
| 7,338,335 B1 * | 3/2008 | Messano | 180/65.22 |
| 7,434,636 B2 * | 10/2008 | Sutherland | 180/2.2 |
| 7,445,275 B2 * | 11/2008 | Woodhouse et al. | 296/211 |
| 7,597,388 B1 * | 10/2009 | Samuel | 296/210 |
| 7,635,600 B2 * | 12/2009 | Zhang et al. | 438/7 |
| 7,635,905 B2 * | 12/2009 | Kim, II | 257/432 |
| 2001/0039960 A1 * | 11/2001 | Shugar et al. | 136/244 |
| 2002/0053816 A1 * | 5/2002 | Teschner et al. | 296/211 |
| 2002/0101097 A1 * | 8/2002 | Muller | 296/211 |
| 2002/0153178 A1 * | 10/2002 | Limonius | 180/2.2 |
| 2003/0217874 A1 * | 11/2003 | Schoenberg | 180/2.2 |
| 2004/0040755 A1 * | 3/2004 | Swindell et al. | 180/2.2 |
| 2004/0255932 A1 * | 12/2004 | Nocera | 126/634 |
| 2005/0046241 A1 * | 3/2005 | Sasaki et al. | 296/216.01 |
| 2005/0133082 A1 * | 6/2005 | Konold et al. | 136/246 |
| 2005/0161079 A1 * | 7/2005 | Gray | 136/291 |
| 2005/0194035 A1 * | 9/2005 | Jin et al. | 136/252 |
| 2005/0211294 A1 * | 9/2005 | Chittibabu et al. | 136/263 |
| 2005/0268962 A1 * | 12/2005 | Gaudiana et al. | 136/255 |
| 2006/0005877 A1 | 1/2006 | Spivack et al. | |
| 2006/0028166 A1 * | 2/2006 | Closset et al. | 320/101 |
| 2006/0037641 A1 * | 2/2006 | Kibbel et al. | 136/251 |
| 2006/0090787 A1 | 5/2006 | Onvural | |
| 2006/0113118 A1 * | 6/2006 | Kim | 180/2.2 |
| 2006/0213697 A1 * | 9/2006 | Sutherland | 180/2.2 |
| 2007/0125417 A1 * | 6/2007 | Johanson et al. | 136/244 |
| 2007/0158978 A1 * | 7/2007 | Woodhouse et al. | 296/210 |
| 2007/0261896 A1 * | 11/2007 | Shaffer et al. | 180/2.2 |
| 2008/0236653 A1 * | 10/2008 | Kelly | 136/251 |

* cited by examiner

VEHICULAR BODY PANEL ENERGY GENERATOR SYSTEM

FIELD

The present invention relates to solar energy systems. More particularly, the present invention relates to a vehicular body panel energy generator system which captures solar energy to augment the electrical power system of a vehicle.

BACKGROUND

Modern vehicles having internal combustion engines (ICE) create electrical power using an ancillary power unit (APU) that supplies electrical power for electrical devices on the vehicle and also recharges the vehicle battery. Typically, the APU is an alternator that converts mechanical energy from the ICE into electrical energy, which is stored in the battery. Several factors have lead to a search for new types of APUs.

Alternators are inefficient because fuel energy is first converted into mechanical energy, after which mechanical energy is converted into electrical energy. This process combines two inefficient power conversions. Alternator APUs generate electrical energy only when the ICE is operating. When the vehicle is stopped but the ICE is operating, the ICE can be run to power the APU, thereby consuming fuel. Alternatively, when the ICE is not operating, stored electric power can be used to power the electrical components of the vehicle although electrical power storage is heavy, costly and takes up space.

Developments in vehicle technology have lead to new types of power-consuming electrical systems such as hybrid drive-trains, advanced starting systems, air-conditioning, x-by-wire, computer processors, entertainment and telematics systems, for example. At the same time, there is increasing concern for fuel efficiency in vehicles. Thus, an APU that uses less vehicular fuel or an alternative fuel to produce electricity is a need in the industry.

SUMMARY OF THE INVENTION

The present invention is generally directed to a vehicular body panel energy generator system. In an illustrative embodiment, the system includes a vehicle body and a plurality of body panels forming the vehicle body. At least one of the body panels comprises a vehicular solar panel. The invention is further directed to a method of generating and utilizing electrical power in a vehicle.

BRIEF DESCRIPTION OF THE DRAWINGS

The invention will now be described, by way of example, with reference to the accompanying drawings, in which.

DETAILED DESCRIPTION

Figure 1:
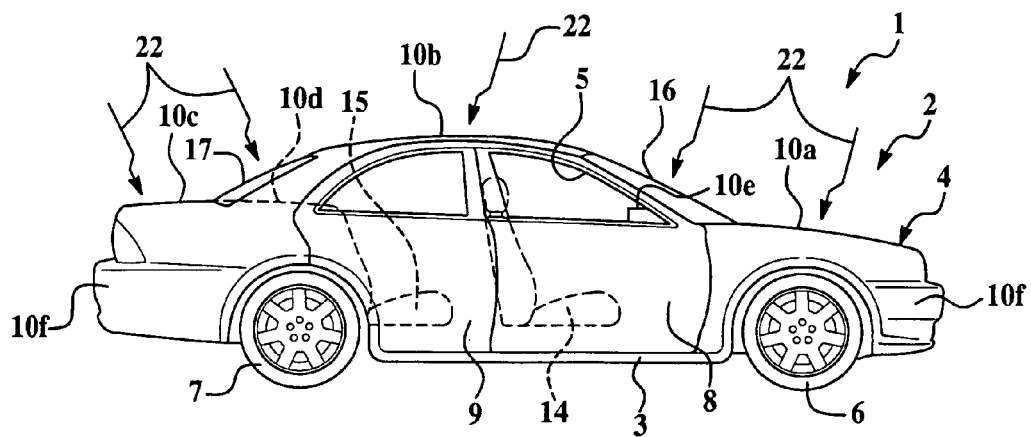
FIG. 1 is a side view of a vehicle in implementation of an illustrative embodiment of a vehicular body panel energy generator system according to the present invention.
Figure 2:
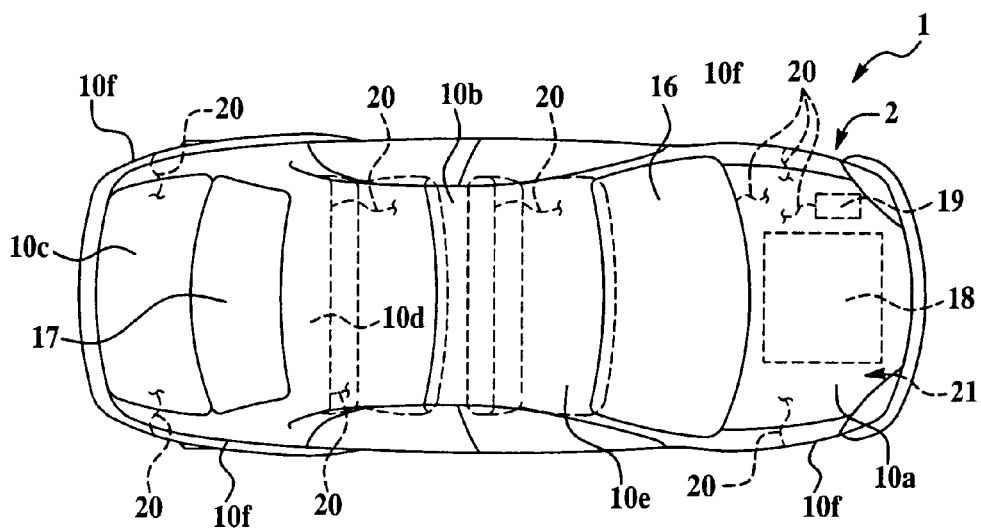
FIG. 2 is a top view of a vehicle in implementation of an illustrative embodiment of a vehicular body panel energy generator system according to the present invention.
Figure 3:
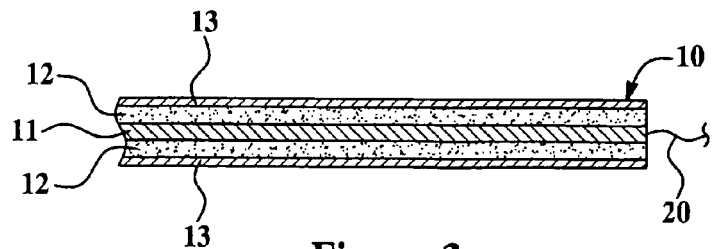
FIG. 3 is a sectional view of a vehicular solar panel of an illustrative embodiment of a vehicular body panel energy generator system according to the present invention.

Referring to FIGS. 1-3 of the drawings, an illustrative embodiment of a vehicular body panel energy generator system, hereinafter system, according to the present invention is generally indicated by reference numeral 1. In FIG. 1, the system 1 is shown incorporated into a vehicle 2. The vehicle 2 may be an internal combustion engine (ICE) vehicle, fuel cell vehicle or electric hybrid vehicle. The vehicle 2 typically has a vehicle frame 3 which is mounted on front wheels 6 and rear wheels 7. A vehicle chassis or body 4 is mounted on the vehicle frame 3 and includes a vehicle cabin 5 having front doors 8 only or both front doors 8 and rear doors 9, as shown. A front seat 14 and a rear seat 15 are provided on the vehicle frame 3, inside the cabin 5. A windshield 16 and a rear window 17 are typically provided in the vehicle body 4 at the front and rear ends, respectively, of the vehicle cabin 5. As shown in FIG. 2, the vehicle 2 further includes an engine compartment 21 which contains an engine 18 and a battery 19.

The vehicle body 4 includes multiple vehicular body panels which form and impart shape to the vehicle body 4. For example, as shown in FIGS. 1 and 2, the vehicular body panels of the vehicle body 4 may include a hood panel 10a which closes the engine compartment 21; a roof panel 10b which forms the roof of the vehicle body 4; a trunk panel 10c which forms the trunk portion of the vehicle body 4; a rear cabin panel 10d which forms the portion of the vehicle cabin 5 that extends between the rear seat 15 and the rear window 17; a dashboard panel 10e which is provided in the vehicle cabin 5, beneath the windshield 16; and/or one or multiple side panels 10f provided on an exterior side or sides of the vehicle body 4.

At least one of the vehicular body panels of the vehicle body 4 is a vehicular solar panel 10. The vehicular solar panel or panels 10 may be in any location on the vehicle body 4 which is exposed to solar energy, including but not limited to the locations of the body panels 10a-10f of FIG. 2. Each of the vehicular solar panels 10 provided on the vehicle 2 is electrically connected to the battery 19 of the vehicle 2, typically via wiring 20, as shown in FIG. 2. Alternatively, each of the vehicular solar panels 10 may be connected directly to an electrical component or components in the vehicle 2. In use of the system 1, as will be hereinafter described, each vehicular solar panel 10 is capable of capturing solar energy 22 and converting the solar energy 22 into electrical energy for powering of the various electrical components of the vehicle 2. Therefore, the vehicular solar panel or panels 10 function as an APU (ancillary power unit) for the vehicle 2. Each vehicular solar panel 10 is capable of collecting energy from ambient light and diffuse light under a cloud cover, as well as direct sunlight.

Each vehicular solar panel 10 on the vehicle 2 may be any type of solar panel or material which is capable of capturing solar energy and converting the solar energy into electrical energy. For example, each vehicular solar panel 10 may be a solar fabric panel. Industrial processes which are well-known to those skilled in the art may be used to fabricate the vehicular solar panel 10 in the form of a solar fabric panel. The processes can be used to form a composite material within which a weave of solar panel fibers is embedded. The composite material is formed into the shape of the vehicular body panel or panels of the vehicle 2, such as the hood panel 10a; the roof panel 10b; the trunk panel 10c; the rear cabin panel 10d; the dashboard panel 10e; and/or the side panel or panels 10f, according to methods which are known to those skilled in the art. The vehicular body panels 10a-10f are incorporated into the vehicle 2 to form and impart a desired shape and appearance to the vehicle body 4 and may be a selected color.

An example of a vehicular solar panel 10 which is fabricated in the form of a solar fabric panel is shown in FIG. 3. The solar fabric-type vehicular solar panel 10 may include a center electrode 11 which is stainless steel or other electrically-conductive material. A solar fabric layer 12 is formed on one or both sides of the center electrode 11. One method of forming the solar fabric layer 12 involves initially coating the center electrode 11 with nano-sized titanium dioxide ($TiO_2$) powder particles. The $TiO_2$ powder particles are then activated with a common dye and filled with an electrolyte. The solar fabric layer 12 is then coated with a conductive layer 13, such as an electrically-conductive polymer, for example.

Each vehicular solar panel 10 may alternatively be made from or combined with micro peltier/seebeck devices (not shown) that use a thermal gradient produced by the sun across the panel to produce electricity. By producing electricity, the micro peltier/seebeck devices also increase the flow of heat through the vehicular solar panel 10, using solar heat to warm the vehicle in cool or cold weather. The devices can also be used as heat pumps, in which case a forward current applied to the vehicular solar panel 10 causes the outer surface of the panel to cool and the inner surface to heat. A reverse current applied to the vehicular solar panel 10 causes the outer surface of the panel to warm and the inner surface of the panel to cool, thereby cooling the interior of the vehicle. A useful feature of the vehicular solar panels 10 is their electrical conductivity. Therefore, the vehicular solar panels 10 can replace power lines, network lines and the like in the vehicle into which they are incorporated.

As shown in FIG. 1, in typical use of the system 1, the vehicular solar panel or panels 10 collectively function as an APU (ancillary power unit) which creates and supplies electrical power to the battery 19 for the powering of electrical components in the vehicle 2. At least one or all of the vehicular body panels 10a-10f may be a vehicular solar panel 10. Accordingly, in the event that each of the vehicular body panels 10a-10f is a vehicular solar panel 10, during operation of the vehicle 2, solar energy 22 impinges on each of the vehicular solar panels 10 of the vehicle 2. The hood panel 10a, roof panel 10b and truck panel 10c of the vehicle body 4 are directly exposed to the solar energy 22, whereas the rear cabin panel 10d and dashboard panel 10e are exposed to the solar energy 22 through the rear window 17 and windshield 16, respectively. The side panels 10f of the vehicle body 4 are also exposed to solar energy 22, although typically to a lesser extent than the hood panel 10a, roof panel 10b and trunk panel 10c.

The vehicular solar panels 10 on the vehicle 2 convert the solar energy 22 into electrical energy, which is transmitted to the battery 19 through the wiring 20 and stored in the battery 19. Therefore, during operation of electrical components in the vehicle 2, electrical energy drained from the battery 19 is constantly replenished by electrical energy from the vehicular solar panels 10, as necessary, both when the engine 18 is being operated and when the engine 18 is turned off. This facilitates powering of electrical components in the vehicle 2 without the need to operate the engine 18 in order to replenish the electrical energy in the battery 19.

It will be appreciated by those skilled in the art that the system 1 of the present invention has the potential to generate sufficient quantities of electrical power to constantly replenish electrical power drained from the battery 19. This ensures adequate electrical power for functioning of the electrical components of the vehicle 2 whether or not the engine 18 is operating since 1.2 square meters of sunlight provides 1,200 Watts of electric power, assuming 100% efficiency in the conversion of solar energy into electrical energy. Unlike electrical energy generated by coal or nuclear power, solar energy is clean and devoid of fuel cost.

Figure 4:
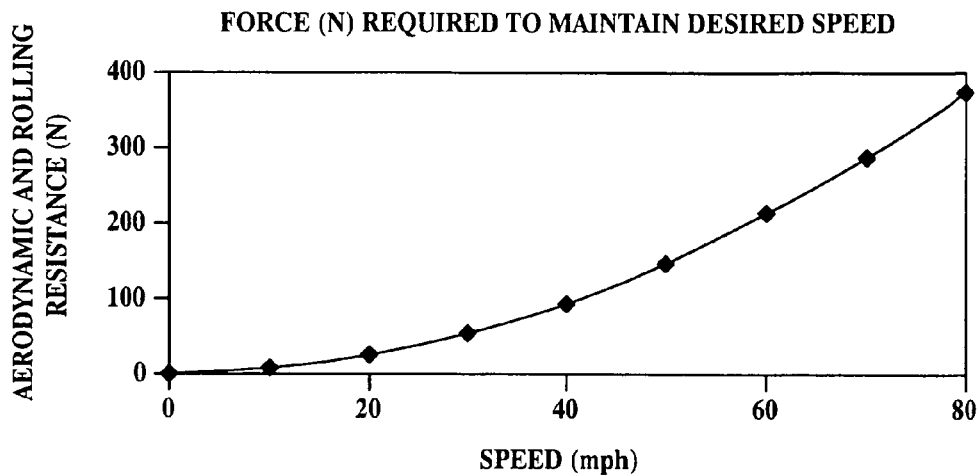
FIG. 4 is a graph which indicates vehicle aerodynamics and resistance (N) plotted as a function of vehicular speed (mph) during operation of an average sized vehicle.
Figure 5:
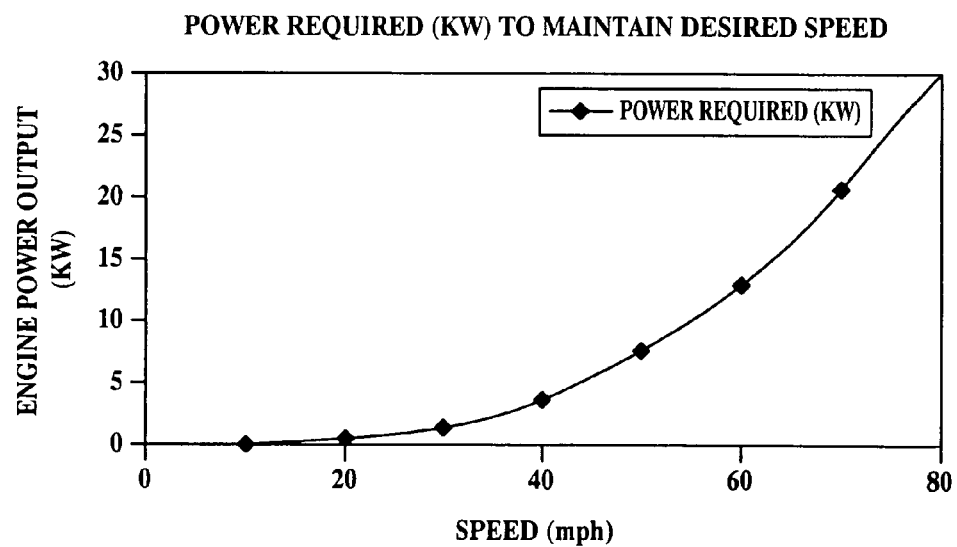
FIG. 5 is a graph which indicates engine power output (kilowatts) required to maintain a given speed (mph) of an average sized vehicle.

A vehicle requires a relatively large quantity of power to accelerate from rest to a cruising speed. At cruising speed, however, the vehicle needs only a sufficient quantity of power which is necessary to maintain a constant speed by balancing aerodynamic forces with tire rolling resistance. As shown in the graph of FIG. 4, at lower vehicular speeds, much less power is required to maintain a constant speed of the vehicle as compared to that required to maintain higher speeds of the vehicle and follows a nonlinear curve. Aerodynamic forces and tire rolling resistance are considered to be unrecoverable forces because they are lost and not able to be captured for use, as is the case in a braking scenario in which regenerative braking can convert and store the energy of the moving mass of the vehicle into the battery system. Power required to maintain speed must overcome the Aerodynamic forces and tire rolling resistance, as shown in the graph of FIG. 4, multiplied by the vehicle speed. The quantities of power (in kilowatts) which are necessary to maintain selected speeds (in mph) of a vehicle are shown in the graph of FIG. 5.

In a hybrid-type vehicle, the system 1 has the potential to significantly improve fuel economy or miles per gallon (mpg). Referring again to FIGS. 1 and 2, assuming a solar energy to electrical energy conversion efficiency of 30%, a hood panel 10a having an area of 2 square meters, a roof panel 10b having an area of 2 square meters, a trunk panel 10c having an area of 0.5 square meters and side panels 10f having a total of 3 square meters (for a total of 7.5 square meters, excluding the rear cabin panel 10d and the dashboard panel 10e), the total magnitude of solar power captured by the system 1 is 1.95 KW, as follows:

$$\text{Total solar power} = 7.5 \text{ m}^2 \times 1000 \text{ W/m}^2 \times 0.30 \text{ efficiency} = 2.25 \text{ KW}$$

Figure 6:
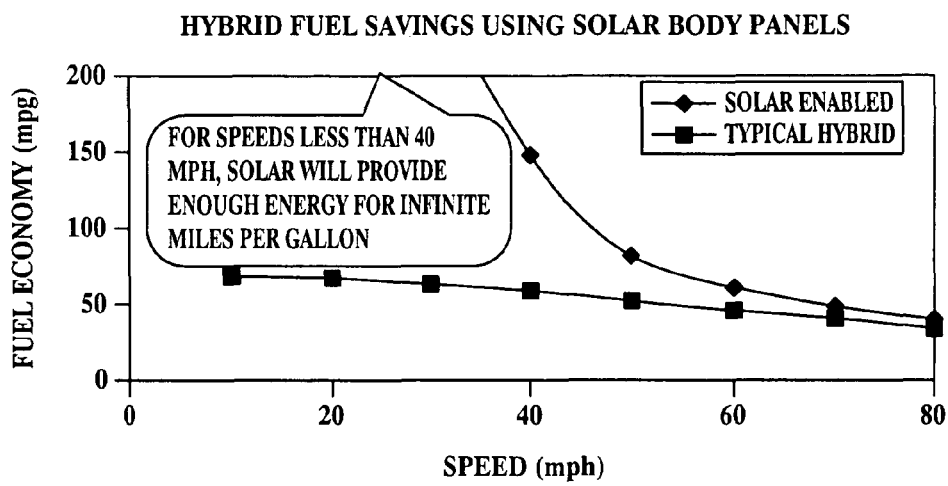
FIG. 6 is a graph which indicates potential fuel economy (mpg) as a function of speed (mph) in a hybrid electric vehicle which is equipped with a vehicular body panel energy generator system.

As shown in FIG. 6, at speeds of less than 40 mph, an internal combustion engine of a solar-enabled vehicle can potentially be turned off with infinite mpg achievable, as compared to conventional hybrid vehicles in which the internal combustion engine can be turned off at speeds below 20 mph with limited mpg achievable. For speeds greater than 40 mph, there still exists a large net increase in mpg up to highway speeds for the solar-enabled vehicle, with the engine capable of being turned off at speeds of up to 50 mph for cruising for long distances. This leads to fewer oil changes, longer engine life, less use of conventional brake pads through regenerative braking, and reduced emissions.

Figure 7:
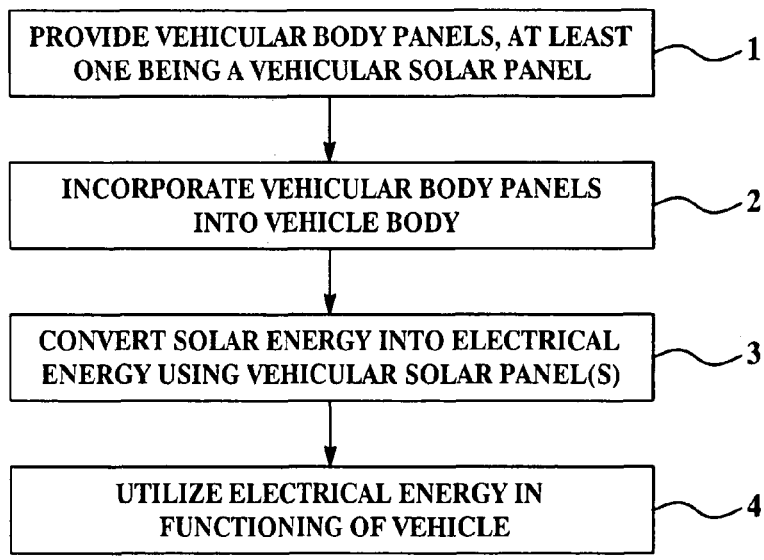
FIG. 7 is a flow diagram which illustrates steps carried out according to a method of generating and utilizing electrical power in a vehicle in accordance with the present invention.

Referring next to FIG. 7, a flow diagram is shown which illustrates steps carried out according to a method of generating and utilizing electrical power in a vehicle in accordance with the present invention. In step 1, multiple vehicular body panels are provided. At least one of the vehicular body panels is a vehicular solar panel. The vehicular solar panel may be a vehicular body panel which is integrated with a solar fabric (solar fabric panels) or other solar material or may be any type of solar panel which is capable of capturing solar energy and converting the solar energy into electrical energy. The solar fabric or other material may pervade the structure of the vehicular body panel or may be limited to a portion of the vehicular body panel.

In step 2, the vehicular body panels are incorporated into a vehicle body of a vehicle and form the shape of the vehicle body. The vehicle may be an internal combustion engine (ICE) vehicle, fuel cell vehicle or electric hybrid vehicle, for example. The vehicular solar panels are provided in areas of the vehicle which are exposed to sunlight when the vehicle is outdoors. For example, the vehicular solar panels may form a part of or may be fabricated to form any type of vehicular body panel including but not limited to a hood panel, a roof panel, a trunk panel, a rear cabin panel, a dashboard panel and/or a side panel or panels of the vehicle, as was heretofore described with respect to FIGS. 1 and 2. Each vehicular solar panel is typically connected to a battery in the vehicle for the transmission of electrical power generated by the vehicular solar panel or panels to the battery. Alternatively, each vehicular solar panel may be connected directly to an electrical component in the vehicle.

In step 3, the solar energy which impinges on the vehicular solar panel or panels in the vehicle is converted into electrical energy. The electrical energy generated by the vehicular solar panel or panels is transmitted to the battery, where the electrical energy is stored for use in the vehicle. Alternatively, the electrical energy may be transmitted directly to an electrical component or components in the vehicle. It will be appreciated by those skilled in the art that the engine of the vehicle need not be operated to maintain the flow of electrical power to the battery or component, since the vehicular solar panel or panels generate electrical power using solar energy both when the engine is operating and when the engine is turned off.

In step 4, the electrical energy stored in the battery or delivered directly to the electrical component or components is used in the functioning of the electrical system or systems in the vehicle. For example, the electrical energy in the battery may be used to power an electric air conditioner, entertainment systems and the like. In the case of a fuel cell vehicle or fuel cell hybrid, the electrical energy can be used to perform hydrolysis reactions if the vehicle is parked and the battery is charged.

While the preferred embodiments of the invention have been described above, it will be recognized and understood that various modifications can be made in the invention and the appended claims are intended to cover all such modifications which may fall within the spirit and scope of the invention.

What is claimed is:

1. A vehicular body panel energy generator system, comprising:
    a vehicle body;
    a plurality of body panels forming said vehicle body;
    wherein at least one of said plurality of body panels is a vehicular solar panel; and,
    wherein said vehicular solar panel comprises a solar fabric panel within said at least one body panel, said solar fabric panel corresponding to a shape of substantially an entirety of said at least one body panel, said vehicular solar panel comprising a composite material within which a weave of solar fibers is embedded, said weave of solar fibers disposed upon an electrode layer, said electrode layer comprising an electrically conductive sheet of material.

2. The system of claim 1 wherein said vehicular solar panel comprises a hood panel.

3. The system of claim 1 wherein said vehicular solar panel comprises a roof panel.

4. The system of claim 1 wherein said vehicular solar panel comprises a trunk panel.

5. The system of claim 1 wherein said vehicular solar panel comprises a rear cabin panel.

6. The system of claim 1 wherein said vehicular solar panel comprises a dashboard panel.

7. The system of claim 1 wherein said vehicular solar panel comprises at least one side panel.

8. The system of claim 1 wherein said solar fabric panel further comprises a conductive polymer layer provided upon said weave of solar fibers.

9. The system of claim 8 wherein said solar fabric layer comprises titanium dioxide powder particles.

10. The system of claim 8 wherein said conductive layer comprises a conductive polymer.

11. The system of claim 1 further comprising a battery connected to said vehicular solar panel.

12. A vehicular body panel energy generator system, comprising:
    a vehicle body;
    a plurality of body panels forming said vehicle body and imparting shape to said vehicle body;
    wherein each of said plurality of body panels is a vehicular solar panel; and,
    wherein said vehicular solar panel comprises a solar fabric panel within a respective body panel, said solar fabric panel corresponding to a shape of substantially an entirety of said respective body panel, said vehicular solar panel comprising a composite material within which a weave of solar fibers is embedded, said weave of solar fibers disposed upon an electrode layer, said electrode layer comprising an electrically conductive sheet of material.

13. The system of claim 12 wherein said plurality of body panels comprises a hood panel, a roof panel, a trunk panel and a plurality of side panels.

14. The system of claim 12 wherein said solar fabric panel further comprises conductive polymer layer provided upon said weave of solar fibers.

15. A method of generating and utilizing electrical power in a vehicle, comprising:
    providing a plurality of vehicular body panels, wherein at least one of said plurality of vehicular body panels is a vehicular solar panel;
    forming a vehicle body using said plurality of vehicular body panels, said vehicular solar panel comprising a solar fabric panel within said at least one body panel, said solar fabric panel shaped into a shape corresponding to substantially an entirety of said at least one body panel, said vehicular solar panel comprising a composite material within which a weave of solar fibers is embedded, said weave of fibers disposed upon an electrode layer, said electrode layer comprising an electrically conductive sheet of material; and
    converting solar energy into electrical energy using said vehicular solar panel.

16. The method of claim 15 further comprising using said electrical energy in functioning of said vehicle.

17. The method of claim 15 wherein said solar fabric panel further comprises a conductive polymer layer provided upon said weave of solar fibers.

* * * * *